(12) United States Patent
Zakharov et al.

(10) Patent No.: US 11,763,586 B2
(45) Date of Patent: Sep. 19, 2023

(54) METHOD AND SYSTEM FOR CLASSIFYING DOCUMENT IMAGES

(71) Applicant: Kyocera Document Solutions Inc., Osaka (JP)

(72) Inventors: Oleg Y. Zakharov, Walnut Creek, CA (US); Aaron Sahagun, Pleasant Hill, CA (US); Atsushi Yuki, Concord, CA (US)

(73) Assignee: Kyocera Document Solutions Inc., Osaka (JP)

( * ) Notice: Subject to any disclaimer, the term of this patent is extended or adjusted under 35 U.S.C. 154(b) by 137 days.

(21) Appl. No.: 17/397,349

(22) Filed: Aug. 9, 2021

(65) Prior Publication Data

US 2023/0040442 A1 Feb. 9, 2023

(51) Int. Cl.
| | |
|---|---|
| *G06V 30/413* | (2022.01) |
| *G06V 30/414* | (2022.01) |
| *G06V 30/418* | (2022.01) |
| *G06F 18/22* | (2023.01) |
| *G06F 18/241* | (2023.01) |
| *G06F 18/21* | (2023.01) |

(52) U.S. Cl.
CPC ........ *G06V 30/413* (2022.01); *G06F 18/2163* (2023.01); *G06F 18/22* (2023.01); *G06F 18/241* (2023.01); *G06V 30/414* (2022.01); *G06V 30/418* (2022.01)

(58) Field of Classification Search
CPC .. G06V 30/413; G06V 30/418; G06V 30/414; G06F 18/22; G06F 18/2163; G06F 18/241
See application file for complete search history.

(56) References Cited

U.S. PATENT DOCUMENTS

| | | | |
|---|---|---|---|
| 2004/0042670 A1* | 3/2004 | Moroo | G06T 9/005 382/232 |
| 2005/0238257 A1 | 10/2005 | Kaneda | |
| 2006/0120627 A1* | 6/2006 | Shiiyama | G06V 30/414 382/305 |
| 2011/0043869 A1 | 2/2011 | Okajo | |
| 2018/0276460 A1 | 9/2018 | Kawano | |

* cited by examiner

*Primary Examiner* — David Perlman
(74) *Attorney, Agent, or Firm* — MILLEN, WHITE, ZELANO & BRANIGAN, P.C.; William Nixon; Wan-Ching Montfort (57) ABSTRACT

A method and system are used for managing and classifying electronic document images. Each of the electronic document images is divided into an array of image segments. The method extracts image features from each of the image segments to obtain numerical coefficients for each of the image segments. The numerical coefficients are compared with each other to generate sub-codes. A classification code is determined as a combination of the sub-codes. The classification codes of a plurality of electronic document images can be stored in a database for further analysis. Based on the classification codes, similarity rates between at two document images can be determined.

19 Claims, 7 Drawing Sheets

METHOD AND SYSTEM FOR CLASSIFYING DOCUMENT IMAGES

FIELD OF THE INVENTION

The present invention relates to a method and system for processing and classifying electronic document images. More particularly, the present invention relates to a method and system for categorizing the electronic document images after being classified for further use.

DESCRIPTION OF THE RELATED ART

Classification of document images is a well-known task that often consumes AI/ML (artificial intelligence/machine learning) approaches. With AI/ML approach, the document classification task requires a training data set of images in order to train a classification model. Sometimes it takes several hours to train a classification model. Generally, each image of the training data set needs to be labeled by a person with a specific name of category (class), which may be mistakenly labeled due to lack of experiences or poor judgment of the person. When such cases happen, the trained classification model will lead to miss-classification of the document images. The entire process needs to be conducted again, resulting in the waste of time and human labors.

SUMMARY OF THE INVENTION

A method for classifying document images using a computing device is disclosed. The method comprises dividing a document image into an array of image segments, each of which forms a portion of the document image and includes image features comprising at least one of a text field and graphical elements. The method further comprises extracting image features from each of the image segments, and processing the image features by using an image processor to generate numerical coefficients for each of the image segment. The numerical coefficients are generated by the image processor based on the image features appeared in each of the image segments. The method also comprises generating a number of sub-codes by comparing the numerical coefficients of respective pairs of consecutive image segments in the array of image segments. Based on the sub-codes, a classification code for the document image can be represented as a combination of the sub-codes. The method further comprises saving the classification code in a database.

An apparatus for classifying document images is also disclosed. The apparatus comprises an inputting device for receiving a document image, and a computing device for receiving and processing the document image from the inputting device. The computing device comprises a processor for dividing the document image into an array of image segments, an image processor for extracting image features from each of the image segments of the array to generate numerical coefficients for image segments of the array, a comparator for comparing the numerical coefficients of respective pairs of consecutive image segments of the array to generate a number of sub-codes for the compared respective pairs of consecutive segments of image of the array, and a database for storing the classification code of the document image. Each of the numerical coefficients corresponds to one of the image segments and the image features include graphical parameters comprising at least one of a text field and graphical elements. Further, the combination of the number of sub-codes forms a classification code for the document image.

A method for calculating similarity rates between a number of document images using a computing device is further disclosed. For each document image, the method comprises dividing each of the document images into an array of image segments, each of which corresponds to one of the image segments of the array, and each of the image segments of the array forms a portion of the document image and includes graphical parameters comprising at least one of a text field and graphical elements. The method further comprises extracting image features from each of the image segments and processing the image features to obtain numerical coefficients for each of the image segments, comparing the numerical coefficients of respective pairs of consecutive image segments of the array to generate a number of sub-codes, and generating a classification code for the document image. The classification codes are a combination of the number of sub-codes. The method further generates similarity rates between the document images by comparing the classification codes of the document images.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The preferred embodiments of the present invention generate classification codes for document images without consuming Machine Learning or Artificial Intelligence approaches. The preferred embodiments employ a quick unsupervised classification (or pre-classification) algorithm, without involving a human data preparation. The preferred embodiments extract features from document images and generate a classification code for each of the document images. The preferred embodiments further categorize the document images based on their classification codes and calculate a similarity rate between different document images. The classification of document images can further be used as an additional tool to test an image data set before training a classification model. Such quick document classification can help to identify human mistakes during a labeling of the training data set (process of labeling involves people who put 'labels' after visual inspection of each image).

Figure 1:
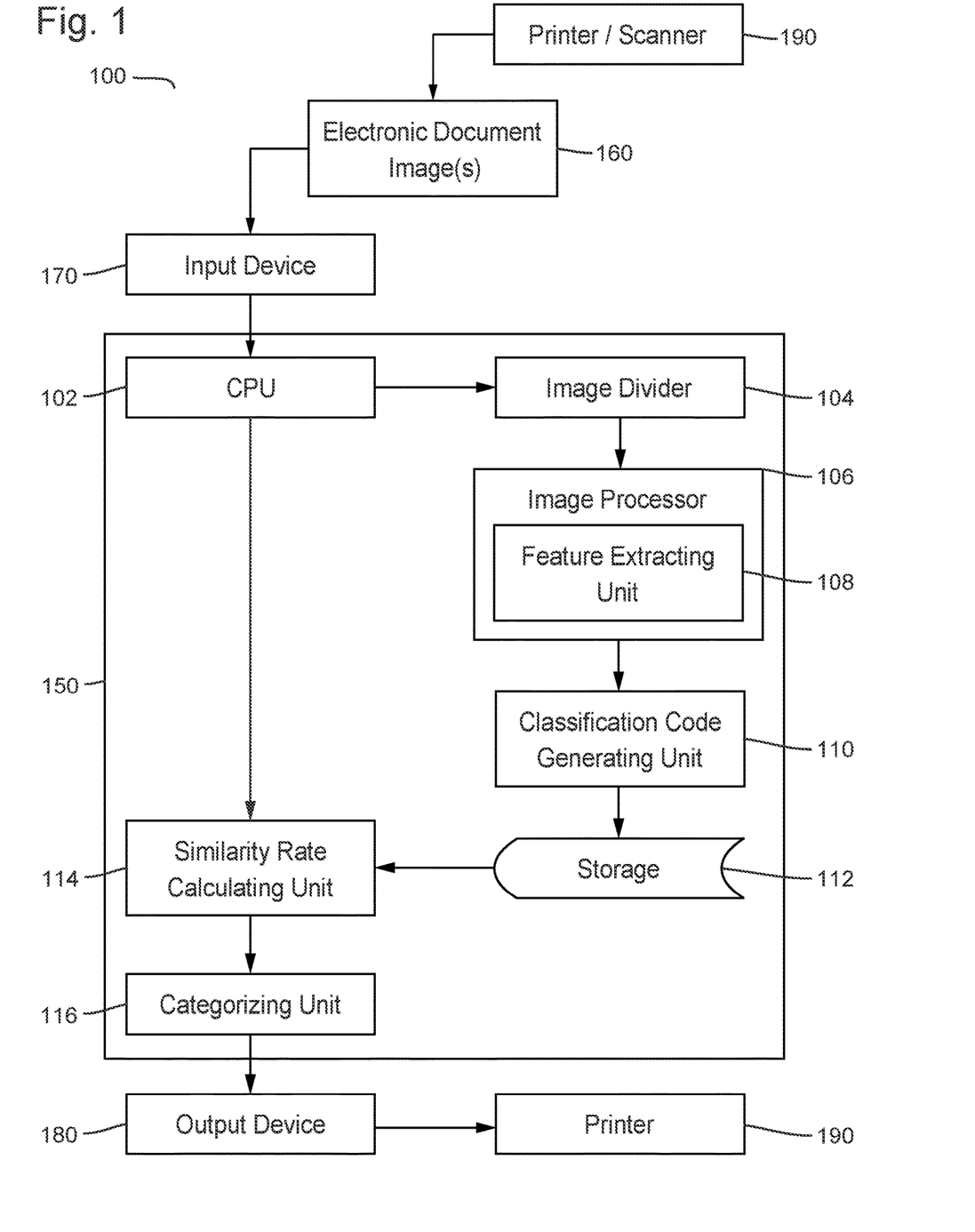
FIG. 1 illustrates a block diagram of a system for managing and classifying electronic document images according to the disclosed embodiments.

FIG. 1 illustrates a block diagram of a system 100 for managing and classifying electronic document images according to the disclosed embodiments. System 100 includes a computing device 150 for processing electronic document images 160 received from input device 170. Electronic document images 160 may be PDF document images stored in a database (not shown) or electronic document images scanned by and sent from printer/scanner 190 that connects to computing device 150 locally or remotely via a network (not shown). Computing device 150 may include CPU 102, image divider 104, and image processor 106 for processing the electronic document images received from input device 170. Classification code generating unit 110 generates classification codes of the electronic document images after being processed. In some embodiments, the classification codes will be saved in storage 112 for further use.

Computing device 100 may also include a similarity rate calculating unit 114 that calculates similarity rates between different electronic document images based on their classification codes saved in storage 112. Computing device 100 may further include categorizing unit 116 that categorizes the electronic document images based on the similarity rate calculated by similarity rate calculating unit 114.

CPU 102 processes the electronic document images received from input device 170. Each of the electronic document images is first divided into a number of image segments by image divider 104. The number of image segments may be divided in a form of a matrix or an array. Image processor 106 processes the number of image segments for each of the electronic document images. In accordance with the preferred embodiments, image processor 106 extracts features from the image segments by using a feature extraction unit 108. Based on the extracted features, image processor 106 designates special codes/numbers to the number of image segments. The special codes/numbers will be used later for generating sub-codes and classification code for each electronic document image.

Figure 4:
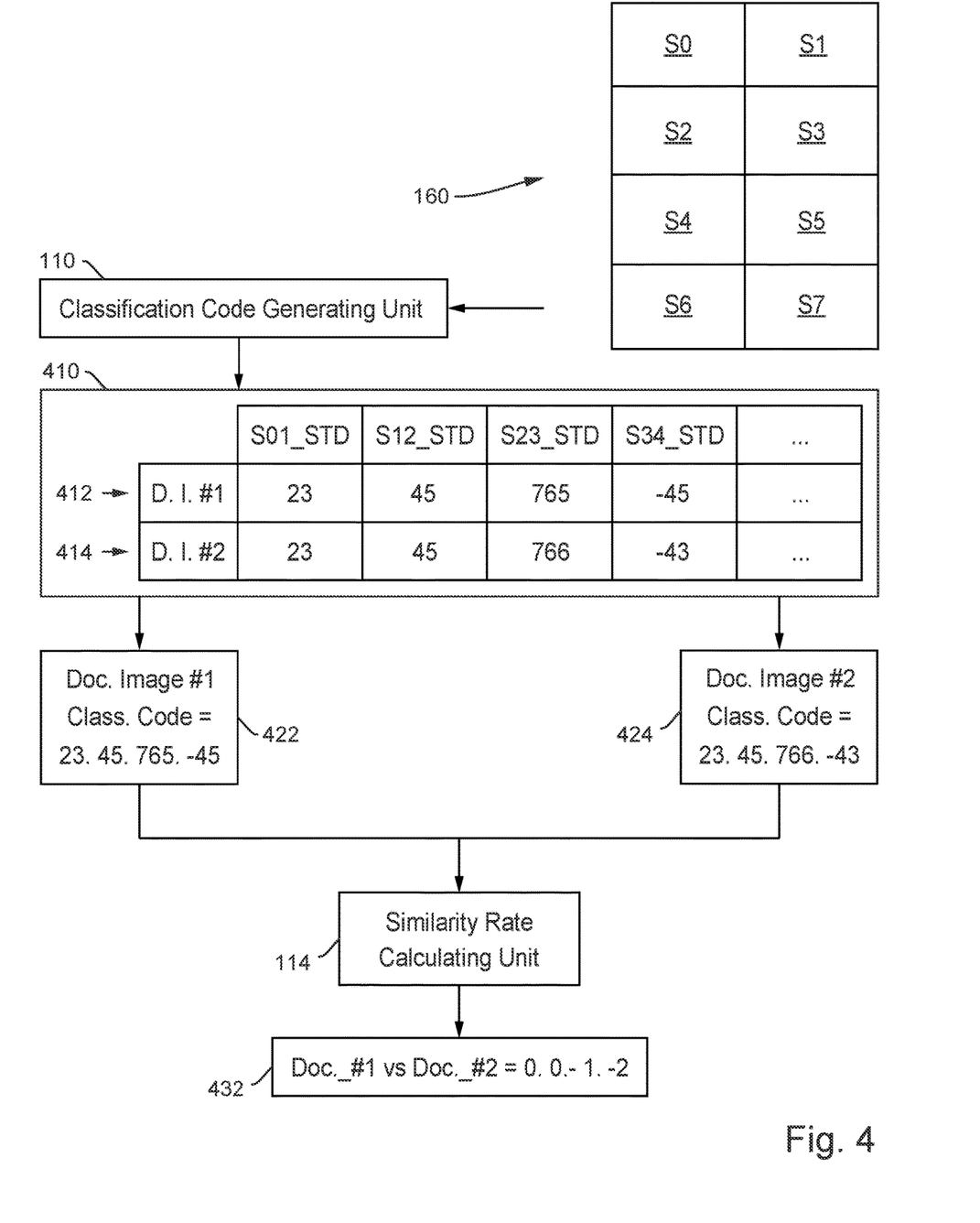
FIG. 4 illustrates an illustrative diagram for generating sub-codes for an electronic document image according to the disclosed embodiments.

In accordance with the preferred embodiments, each document image will be presented by a number of image segments, which may be 3×3 image segments, for example, i.e., 3 vertically and 3 horizontally or 2×4 image segments, i.e., 2 vertically and 4 horizontally. Each segment will be indexed by a sequential number for 0-8, as shown in FIG. 4. A segment of the document image (or "image segment") may include portions of fields, for instance, document's header and footer. Further, each of the image segments includes graphical parameters including partially text fields and graphical elements such as lines, tables, images, blank spaces etc.

Figure 7:
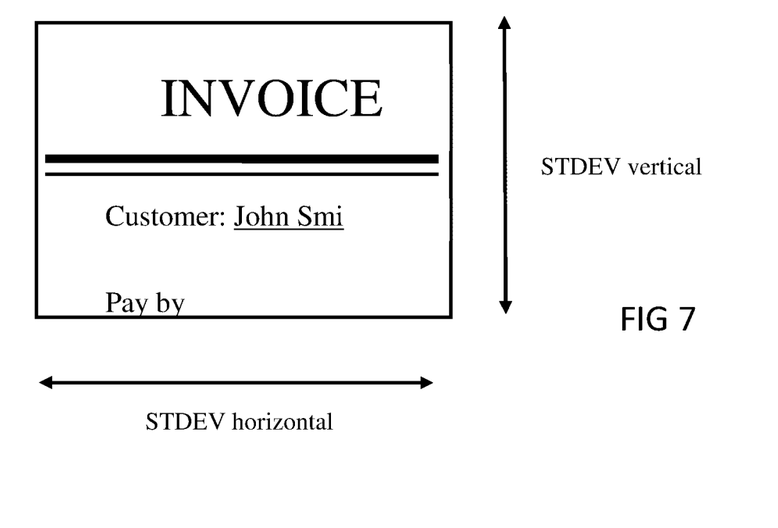
FIG. 7 illustrates an exemplary segment that is categorized in accordance with the disclosed embodiments.

An illustrative segment may be shown as in FIG. 7, of which the features will be extracted to generate a sub-code:

In the example of FIG. 7, the electronic document is an invoice document image. The disclosed embodiments, however, are not limited to invoice document images. Any structured documents that have graphical structures, such as business documents like financial and accounting documents, etc., would be suitable for use in the disclosed embodiments.

Each image segment has its own characteristics and comparing image segments with each other allows to generate classification sub-codes or features. Each image segment will generate a sub-code by classification code generating unit 110.

Figure 8:
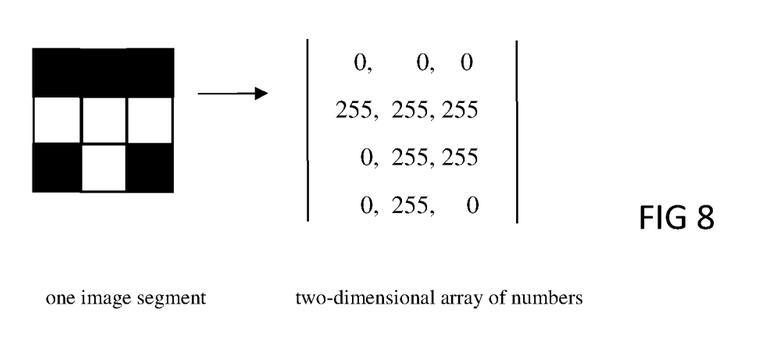
FIG. 8 depicts a diagram showing transferring a one-dimensional array into a two-dimensional array in accordance with the disclosed embodiments.

For example, normally an image segment may be formed in two-dimensional array of pixels (i.e., in a vertical direction and in a horizontal direction.) By extracting the features from the image segment, such as detecting lines, table, text, blank field, graphical elements, and so on shown on the image segment, the image segment may be expressed in a two-dimensional array, as shown in FIG. 8.

Figure 9:
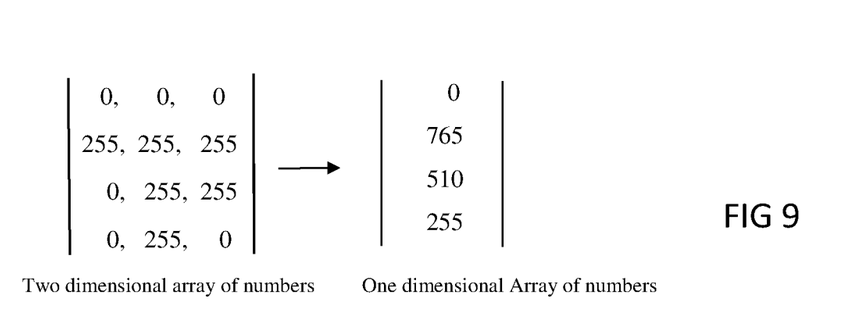
FIG. 9 depicts a diagram showing a horizontal sum transformation from a two-dimensional array of numbers converted into one dimensional array of numbers in accordance with the disclosed embodiments.

To simplify and speed up the operation process, the disclosed embodiments may transform the two-dimensional array into a one-dimensional array either horizontally or vertically. For instance each segment may be presented as a one-dimensional array of sum of pixels counted horizontally (X-axis). The sub-code will then be calculated as a standard deviation coefficient, for example, of the one-dimensional array. FIG. 9 illustrate a horizontal sum transformation, i.e., the two-dimensional array of numbers converted into one dimensional array of numbers.

Transformation two dimensional array into one-dimensional array is a basic mathematical calculation and works pretty fast for small size arrays (segments of the image). Each transformation can be for gray-scaled images (one channel) or for colored images separately for each of RGB color.

For each segment, classification code generating unit 110 calculates the extracted image features as a mean value, performs standard deviation for each direction (horizontal, vertical), and determines coordinates of center of mass. Classification code generating unit 110 also may apply graphical filters as grayscale threshold so that the features of the image segment can be processed more precisely. Further, each of numerical value of the attributes (i.e., the one-dimensional array of pixels) may be normalized or/and rounded by specific coefficients. For example, a mean value of an image segment may be scaled down for coefficient equals 1000:

$$S0\_mean = img\_segment\ 0 \cdot mean(\ )/1000$$

After the above-mentioned operations, each image segment is designated by a set of numerical coefficients. Classification code generation unit 110 generates a sub-code for each pair of image segments by comparing parameters or the numerical coefficients of the pair of image segments. The sub-codes of the number of image segments are then used to generate a classification code for the document image composed of the number of image segments.

In the preferred embodiments according to the present invention, each of the sub-codes may be presented as a value of standard deviation function over the one-dimensional vertical array of numbers, as shown in the following:

$$\text{Sub-code}_n = \text{STDEV}(\text{Array}_v)$$

The sub-code may also be presented as a ratio of two standard deviations, calculated for vertical (one dimensional transformation) array and for horizontal array, as shown in the following:

$$\text{Sub-code}_n = \frac{\text{STDEV}(\text{Array}_v)}{\text{STDEV}(\text{Array}_h)}$$

According to the disclosed embodiments of the present invention, the classification code of the entire document image will be presented as a combination of sub-codes, which are integer numbers, reflecting graphical attributes of each image segment or/and as a ratio of attributes between image segments. Details of the process of generating the classification codes will be described in more details in FIGS. 3-6.

In accordance with the disclosed embodiments, the document images together with their respective classification codes may be saved in storage 112 for further use. For example, similarity rate calculating unit 114 may calculate similarity rates between electronic document images by comparing the classification codes thereof. Categorizing unit 116 may further categorize the electronic document images based on their similarities. In some embodiments, computing device 150 may be used with a search engine for searching document images stored in a database (not shown) that have specific similarity rates with each other or for document images that falls within a specific category. Computing device 150 may also incorporate with output device 180 for outputting document images retrieved from the database after the search process. Output device 180 may be a computer monitor, a display screen, or a user interface.

Printing device 190 may be used to print electronic documents 104 after being selected using output device 180. Printing device 190 may be a multiple-function printing device. Further, printing device 190 may be a printing device locally connected to computing device 150 or wirelessly connected to computing device 150 via a network. Printing device 190 may also be used to scan documents and to convert the scanned documents into electronic document files, such as scanned document images 160 described above. In other words, scanned document images 160 may be received from printing device 190 or a separate scanning device. Details of printing device 190 will be illustrated with reference to FIG. 2.

Figure 2:
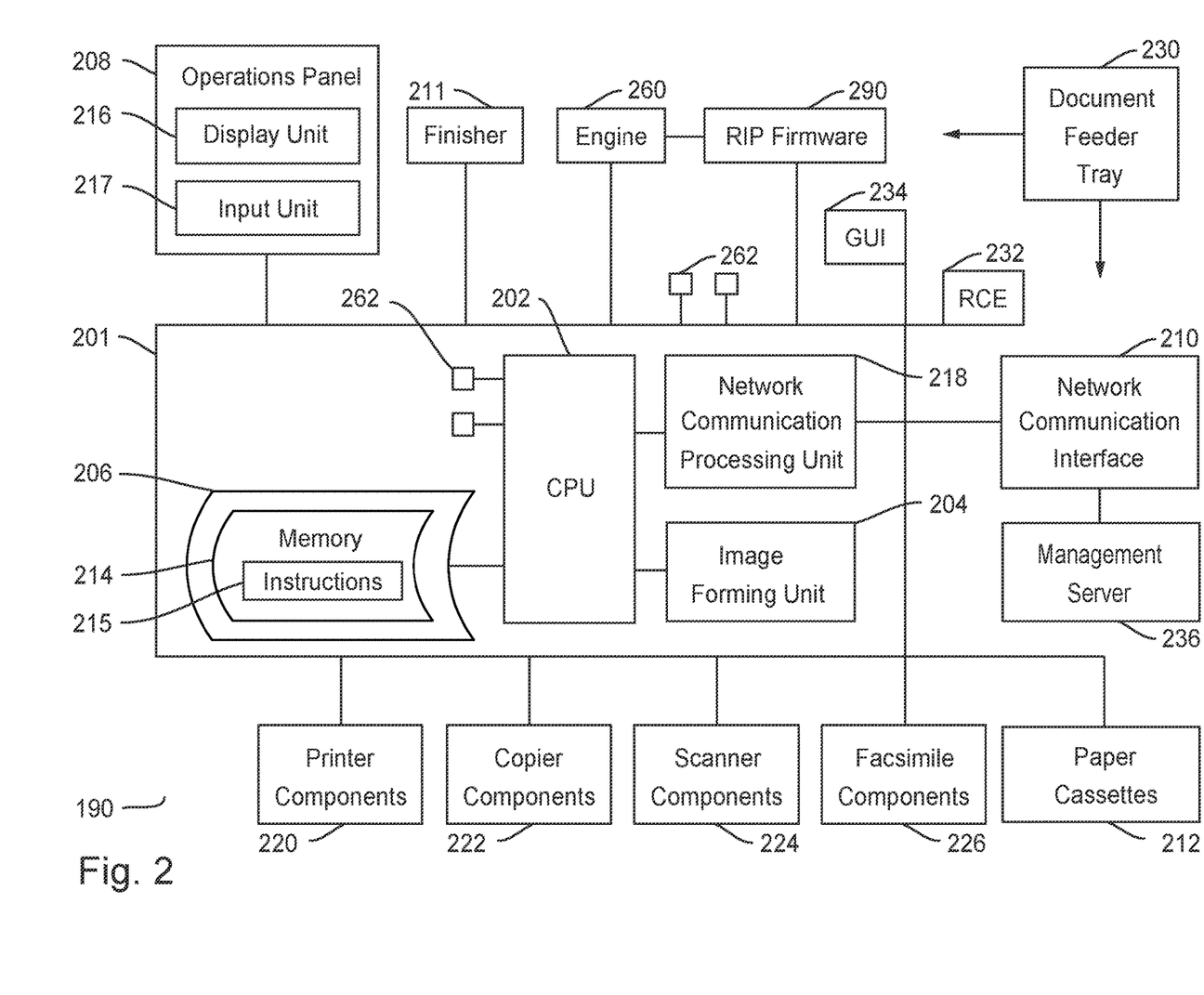
FIG. 2 illustrates a block diagram of a printing device for use with the system for managing and classifying electronic document images according to the disclosed embodiments.

FIG. 2 depicts a block diagram of components of printing device 190 according to the disclosed embodiments. In the disclosure of FIG. 2, printing device 190 may be referred to for illustrative purposes. The architecture shown in FIG. 2 may apply to any multi-functional printing device or image forming apparatus that performs various functions, such as printing, scanning, storing, copying, and the like. As disclosed above, printing device 190 may send and receive data from computing device 150.

Printing device 190 includes a computing platform 201 that performs operations to support these functions. Computing platform 201 includes a computer processing unit (CPU) 202, an image forming unit 204, a memory unit 206, and a network communication processing unit 218. Other components may be included but are not shown for brevity.

Printing device 190, using computing platform 201, may be configured to perform various operations, such as scanning, copying, printing, receiving or sending a facsimile, or document processing. As such, printing device 190 may be a printing device or a multi-function peripheral including a scanner, and one or more functions of a copier, a facsimile device, and a printer. To provide these functions, printing device 190 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 190 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document feeder tray 230 may be the physical components of printing device 190 to receive papers and documents to be processed. A document is placed on or in document processor input feeder tray 230, which moves the document to other components within printing device 190. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory 214 to store instructions 215. Instructions 215 are executable on CPU 202 or other processors associated with printing device 190, such as any processors within components 220, 222, 224, or 226. Memory unit 206 also may store information for various programs and applications, as well as data specific to printing device 190. For example, memory 214 may include data for running an operating system executed by computing platform 201 to support the components within printing device 190. According to the disclosed embodiments, memory unit 206 may store the tokens and codes used in performing the deferral operations for printing device 190.

Memory unit 206 may comprise volatile and non-volatile memory 214. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 190 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 190 to act as a printer, copier, scanner, and a facsimile device.

Printing device 190 also includes an operations panel 208, which may be connected to computing platform 201. Operations panel 208 may include a display unit 216 and an input unit 217 for facilitating interaction with a user to provide commands to printing device 190. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 190.

Printing device 190 also includes network communication processing unit 218. Network communication processing unit 218 may establish a network communication using network communication interface 210, such as a wireless or wired connection with one or more other image forming apparatuses or network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 190. CPU 202 also may retrieve information stored in memory unit 206, such as settings for printing device 190.

Printing device 190 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 190.

Printing device 190 may include one or more sensors 262 that collect data and information to provide to computing platform 201 or CPU 202. Each sensor 262 may be used to monitor certain operating conditions of printing device 190. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 190. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 190 communicates with color management server 106 via network communication interface 210 by utilizing a network protocol. In some embodiments, printing device 190 communicates with GUI 234 and recurrent categorization engine 232 through REST API, which allows the managing server 236 to collect data from multiple devices within content management system 100. REST API and SOAP are application protocols used to submit data in different formats, such as files, XML messages, JSON messages, and the like. By utilizing applicable network communication protocols and application protocols, printing device 190 submits and receives data from a user interface (including input device 120 and output device 180) that is interactive with computing device 150.

Figure 3:
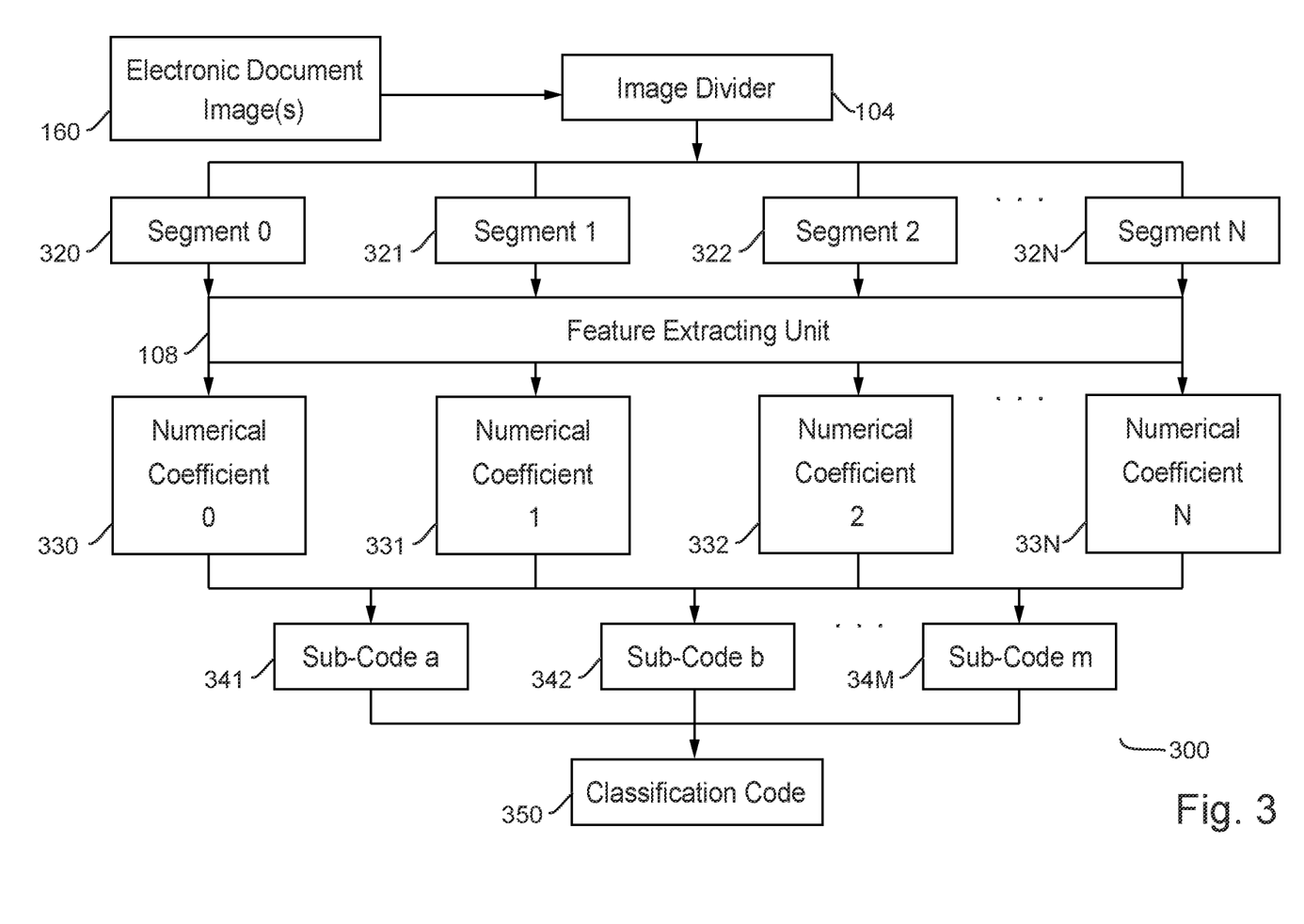
FIG. 3 illustrates a block diagram of a computing device for generating a classification code for an electronic document image according to the disclosed embodiments.

FIG. 3 depicts a block diagram 300 of computing device 150 for generating the classification code of an electronic document image in accordance with the disclosed embodiments. FIG. 3 illustrates more details on how computing device 150 processes document images 160 to generate classification codes.

As described above with reference to FIG. 1, an electronic document image 310 is received and sent to computing device 150 and is divided into a number of image segments by image divider 104. The number of image segments 320 includes segments 320, 321, 322, . . . , 32N. Each of the image segments comprises an array of pixels formed by image features appearing in the image segment. Image processor 106 (in FIG. 1) extracts image features from segments 320-32N and generates numerical coefficients 330, 331, 332, . . . , 33N based on the appearance of the image features. For example, when the detected image features from an image segment comprises graphical parameters including text and lines, and blank space, image processor 106 may designate a number to the image segment based on the density and location of the graphical parameters in this image segment. The number may be referred as a numerical coefficient. In this manner, the array of image segments contained in the document image will be designated as an array of numerical coefficients. As described above, the numerical coefficients may be presented as an array of numbers in the vertical dimension or in the horizontal dimension (i.e., one-dimensional array of pixels.)

Next, classification code generating unit 110 of computing device 150 generates sub-codes 34a, 34b, 34c, . . . , 34M for image segments 321-32N by comparing the numerical coefficients of respective pairs of image segments. The process of generating sub-cods 34a-34M will be further described below in FIG. 4. Classification code 350 is then generated as a combination of sub-codes 34a-34M.

Although not shown in the figure, classification code 350 may be stored in a database for future use.

FIG. 4 depicts an illustrative diagram for generating sub-codes for an electronic document image which will be described with reference to FIG. 3. In FIG. 4, electronic document image 160 is divided into 2×4 mage segments including segments S0, S1, S2, S3, S4, S5, S6, and S7.

To obtain sub-codes for electronic document image 160, respective pairs of adjacent segments are compared to each other. For example, segments S0 and S1 are compared, segments S1 and S2 are compared, segments S2 and S3 are compared, and so on. One disclosed embodiment is to subtract the numerical coefficients of each pair of compared segments, such as subtracting numerical coefficient 331 with numerical coefficient 330 to obtain sub-code 34*a*, which is represented as a number 23 in FIG. 4. An alternative disclosed embodiment is to divide numerical coefficients in vertical direction (e.g., STDEW(Array$_v$)) with numerical coefficients in horizontal direction (e.g., STDEW(Array$_h$)) to obtain the sub-codes. All respective pair of segments are compared in the same manner and an example of portion of the sub-codes generated from are shown in table 410.

Table 410 illustrates sub-codes for two electronic document images, i.e., doc image #1 and doc image #2. Doc image #1 comprises sub-codes 23, 45, 765, and −45, and doc image #2 comprises sub-codes 23, 45, 766, and −43. It is noted that not all the sub-codes are shown in the table for brevity. After extracting features from segments and generating sub-codes, each document image will be associated with a certain number of fields (sub-codes) that can be stored in a database, such as storage 112 of FIG. 1, for further analysis. The number of fields may be adjusted for different sets of training/classification data, but needs to be the same within one dataset.

After sub-codes are generated, classification codes for doc image #1 and doc image #2 will also be generated. The classification code may be presented by 8, 16, 32 etc. numerical sub-codes. Each number reflects graphical features of the segments. As shown in FIG. 4, each number of the classification sub-codes may be a column in a database table. In the case that the classification code includes 4 sub-codes combined by separation symbol (dot), classification codes 422 and 424 for doc image #1 and doc image #2 can be seen like the followings:

Class Code(doc #1)=23.45.765.−45

Class Code(doc #2)=23.45.766.−43

As described above, the document image can be presented as several segments or an array of segments. For instance, a header of the document image can be presented by 2 or 3 segments. Similarly, a footer of the document can be presented by 2 or 3 segments. Difference or ratio graphical parameters between each of the header and each of the footer segments may produce numerical sub-codes, which eventually will be used to generate a classification code of the document image. This approach can reduce discrepancy of image/scan quality, when image can be darker or have some noise. Comparing only parts (segments) of the document image will reduce such defect of an entire document image. But if only one part of the document image (segment) will be significantly different between copies of the similar documents, the classification code will be different for each of the document images.

In accordance with the disclosed embodiments, the classification codes may be stored in storage 112 for further use. In some embodiments, only classification codes are saved in the storage 112 and their corresponding electronic document images are saved in one or more databases in various locations that are accessible through a network. In this case, each classification code may include a header indicating its corresponding document image and its location. Therefore, when an electronic image is requested, computing device 150 will retrieve the electronic image from a database based on the header of the classification code thereof. In this manner, the space used in storage 112 can be largely reduced. Alternatively, the electronic document images along with their classification codes may be stored in the storage 112 or in a separate database. Such an embodiment may be more suitable for electronic document images with smaller sizes.

Similarity rate generating unit 114 generates similarity rates between a of electronic document images. In accordance with the disclosed embodiments, the similarity rate (SimRate) may be calculated as a difference between each part of the classification codes based on the following operation formula:

SimRate(doc #1,doc #2)=ClassCode(doc #1)−ClassCode(doc #2)

Thus, in the example shown in FIG. 4, the similarity rate between doc image #1 and doc image #2 432 will be:

doc_#1 vs doc_#2=0.0.−1.−2

Further, based on the similarity rates, categorizing unit 116 categorizes electronic document images with most similar classification codes and groups them together. The most similar classification codes are those with minimum differences after subtracting the sub-codes from each other. Categorizing electronic document images could be useful with a search engine. Traditionally, when a user searches documents through a search engine, he/she can prompt a Boolean operation by entering key-words through a graphical user interface (GIU). Such key-words input method will take a lot of time as the total number of documents after an initial search can be as large as tens of thousands of electronic documents, sometimes over dozens of pages to be reviewed by the user. This process is cumbersome and not very effective. The disclosed embodiments may categorize similar documents into a number of groups, such as financial documents group, invoice documents group, and so on. By searching documents with categories and/or the similarity rates in addition to key-words, the total amount of documents after an initial search will be significantly reduced. More details about categorizing documents will be described below with reference to FIG. 6.

Figure 5:
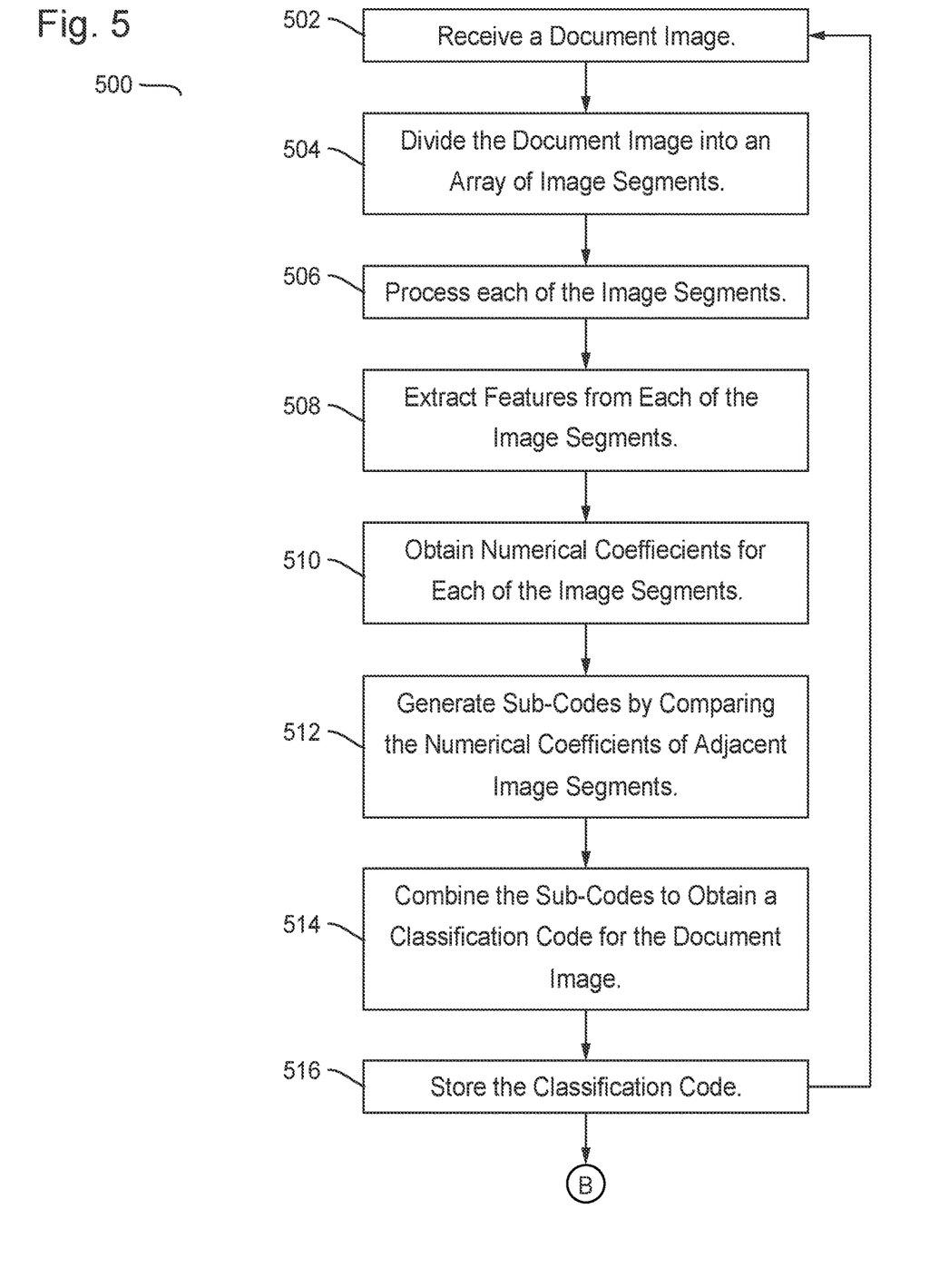
FIG. 5 illustrates a flowchart for performing classifying electronic document images according to the disclosed embodiments.

FIG. 5 depicts a flow chart 500 for generating classification codes for electronic document images in accordance with the disclosed embodiments. In the disclosed embodiments, the electronic document images may be scanned electronic document images sent from a scanning machine or a printing device, such as printing device 190, with a scanning function, or may be electronic document images saved in a database. Generating classification codes may be performed by a computing device, such as computing device 150 of FIG. 1. Flowchart 500 may refer to the features disclosed by FIGS. 1-4 for illustrative purposes. The embodiments disclosed by flowchart 500, however, are not limited to the features of FIGS. 1-4.

Step 502 executes by receiving a document image. Flowchart 500 shows that the document images are processed one by one for the brevity. Flowchart 500, however, may also process a number of document images at the same time. After a document image is received, step 504 executes by dividing the document image into an array of image segments. Each image segment further includes an array of pixels based on image features appeared in the each image segment. The image features may include text fields and graphical parameters, etc. The graphical parameters may include lines, tables, images, and blank spaces.

Step 506 executes by processing each of the image segments and step 508 executes by extracting and analyzing image features from each of the image segments. These processes can be performed by an image processor, such as image processor 106 of FIG. 1. Each of the image segments comprises an array of pixels. The features detected by image processor 106 may comprise lines, table, text, blank field, graphical elements, and the like appearing in the image segment. Based on the detected features, image processor 106 may designate a numerical parameter or a numerical coefficient, to each of the pixels of the array. The array of pixels may be in X-Y (horizontal and vertical) dimensions. For the convenience of calculation, preferably, the disclosed embodiments transform the two-dimension array of pixels into a one-dimension array of pixels counted horizontally or vertically. In the following exemplary embodiments, each image segment will be described as one-dimensional array of pixels in a vertical direction.

Step 510 executes by obtaining numerical coefficients or numerical parameters for each of the image segments. Preferably, the numerical coefficients or numerical parameters are in a form of one-dimensional array. For example, the numerical coefficients of an image segment may be represented as:

$$\begin{vmatrix} 0 \\ 765 \\ 510 \\ 255 \end{vmatrix}$$

After the numerical coefficients are obtained, step 512 executes by generating sub-codes by comparing the numerical coefficients of adjacent image segments. In accordance with the disclosed embodiments, a sub-code may be obtained by performing a standard deviation function over the one-dimensional vertical array of numbers, as the one shown above. In this case, the sub-code represents as a difference between the numerical coefficients of two image segments.

Alternatively, a sub-code may be obtained as a ratio of two standard deviations, calculated for vertical (one dimensional transformation) array and for horizontal array.

After all the image segments are compared, serial sub-codes will be generated.

Step 514 executes by obtaining a classification code for the document image. In accordance with the disclosed embodiments, the classification code will be a combination of the serial sub-codes, such as (23.45.765.–45).

Afterward, the classification code of the document image can be stored in a storage device, such as storage 112 of FIG. 1. Steps 502-516 are repeated until all document images are processed and their respective classification codes are obtained and stored for further analysis. The classification codes stored in storage 112 may be used in a process of obtaining similarity rates between various document images.

Figure 6:
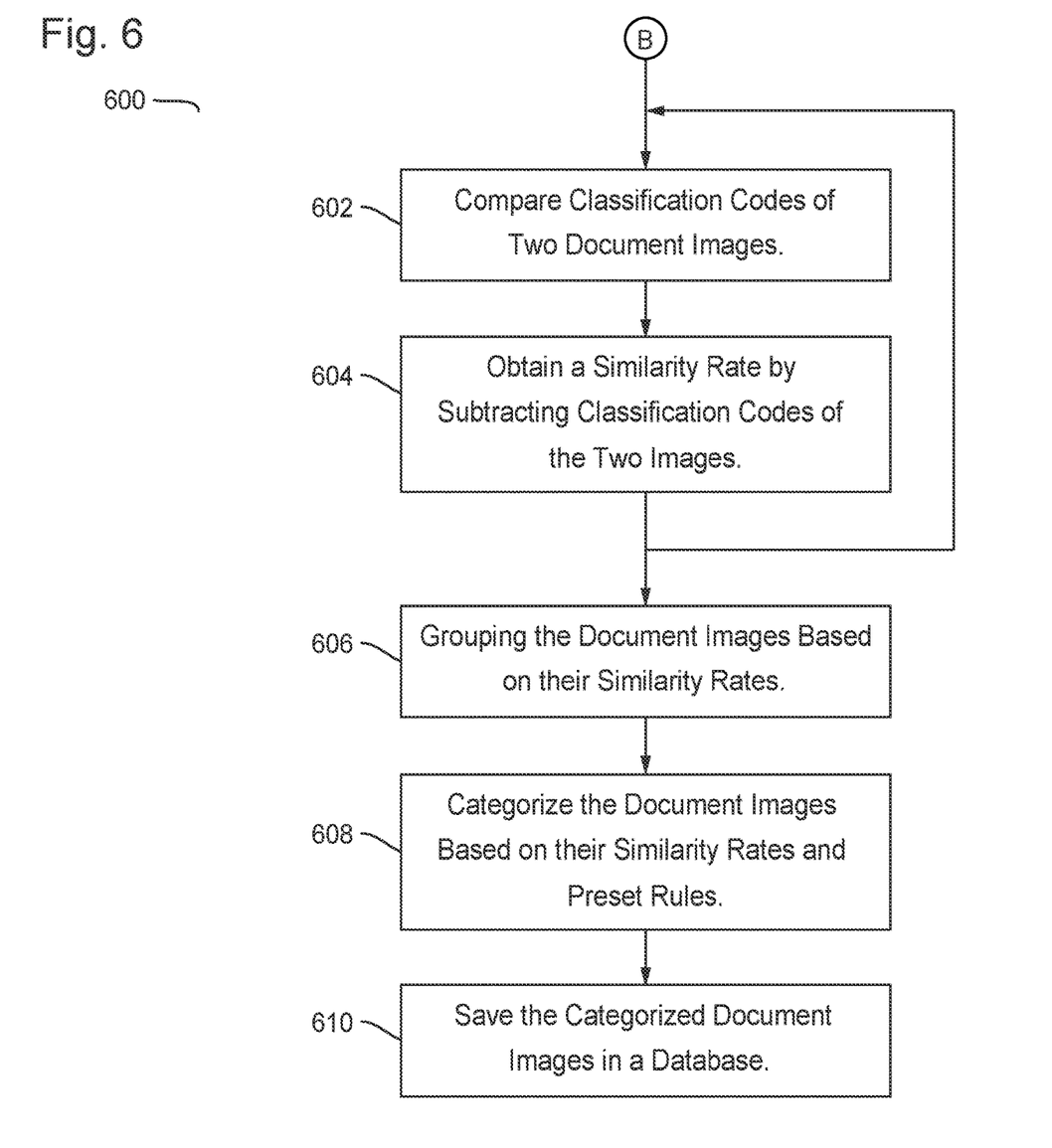
FIG. 6 illustrates a flowchart for obtaining similarity rates between different document images and for categorizing the document images based on the similarity rates according to the disclosed embodiments.

FIG. 6 depicts a flowchart 600 for obtaining similarity rates between various document images and categorizing the document images in accordance with the disclosed embodiments. As described above with reference to FIGS. 1-5, knowing similarity rates between different document images may be helpful when the disclosed embodiment is used with a search engine (not shown). Similarity rates would further limit the searching criteria to obtain similar documents more correctly and faster.

Step 602 executes by comparing the classification codes of two document images and step 604 executes by subtracting the classification codes. The result is the similarity rate. For example, if a first classification code of a first document image is (23.45.765.–45) and a second classification code of a second document image is (23.45.766.–43), the similarity rate of these two document images will be (0.0.–1.–2.) When more numbers in the similarity rate are zero or closer to zero, it means that the similarity rate between two document images is higher. Steps 602 and 604 can be repeated until all document images are processed and their similarity rates are obtained.

Step 606 executes by grouping the document images with higher similarity rates. The rules for grouping the document images may depend on similarity rates that fall within a predetermined range. The rules for grouping the document images may also depend on their contents. For example, a reference document image is an invoice image. The reference document image has a first classification code. Process 600 may execute comparing the classification codes of other document images with the classification code of the reference document image to obtain similarity rates of these other documents images in relative to the reference document image. The higher the similarity rate is, the more similar of the document images are to the reference document image. These document images with similarity rate falling within a predetermined range may be grouped together and categorized as an Invoice category. Other kinds of structured document images may be compared and categorized in the same manner. For example, some document images with similarity rate falling with a predetermined range with a reference accounting report document image may be grouped together and categorized as Accounting Report category.

The categorizing process may also be executed by step 608. In addition to above, step 608 further executes by categorizing the document images based on their similarity rate and preset rules. For example, the document images having minimum differences between their classification codes, i.e., highest similarity rate, may be grouped together. Also, based on the contents of the document images, they are categorized in a specific group, such as the invoice group.

At last, step 610 executes by saving the categorized document images in a database for further use. For example, when used with a search engine, in addition to key words entered by a user, the user may also enter desired similarity rate range and/or desired category as additional searching criteria.

The system and method in accordance with the disclosed embodiments generate classification codes for electronic document images using mainly mathematical operations, without consuming machine learning or artificial intelligence approaches. By labeling the electronic document images with unique classification codes, it will help to identify human mistakes during a labelling of a training data set. More particularly, it will help to reduce the time and effort when conducting a document search in various database.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for classifying document images using a computing device, comprising:
   dividing a document image into an array of image segments, wherein each of the image segments forms a portion of the document image and includes image features comprising at least one of a text field and graphical elements;
   extracting the image features from each of the image segments;
   processing the image features extracted from each of the image segments by using an image processor to generate numerical coefficients for each of the image segment, wherein the numerical coefficients are generated by the image processor based on the image features appeared in each of the image segments;
   comparing the numerical coefficients of respective pairs of consecutive image segments of the array to generate a number of sub-codes, each of which corresponds to a comparison result of a pair of the consecutive image segments;
   generating a classification code for the document image based on the sub-codes, wherein the classification code is a combination of the sub-codes; and
   storing the classification code of the document image,
   wherein each of the image segment comprises an array of pixels in two-dimensional directions, wherein the two-dimensional array of pixels is transformed into a one-dimensional array of pixels in either vertical or horizontal direction.

2. The method of claim 1, wherein the numerical coefficients of each of the image segments is calculated as one of a mean value, a standard deviation for at least one of vertical and horizontal directions, and a coordinate of center of mass of the one-dimensional array of pixels.

3. The method of claim 1, wherein each of the sub-codes are generated as a value of standard deviation function over the one-dimensional array of pixels of the image segment.

4. The method of claim 1, wherein each of the sub-codes are generated as a ratio of two standard deviations, calculated for the one-dimensional array of pixels in vertical direction and the one-dimensional array of pixels in horizontal direction.

5. The method of claim 1, wherein the sub-codes are integer numbers that reflect graphical attributes of the image segments of the array or a ratio of attributes between the image segments of the array.

6. The method of claim 1, wherein the image features further include lines, tables, images, and blank spaces.

7. The method of claim 1, further comprising generating similarity rates between at least two document images, each of the document images has a classification code comprised of a combination of sub-codes, wherein the similarity rate is generated by subtracting sub-codes contained in the classification codes of the document images that are to be compared.

8. The method of claim 7, further comprising categorizing the document images based on the similarity rates, wherein the document images with higher similarity rates are placed in a group of similar document layouts.

9. An apparatus for classifying document images, comprising:
   an inputting device for receiving a document image;
   a computing device for receiving and processing the document image from the inputting device, comprising:
      a processor for dividing the document image into an array of image segments;
      an image processor for extracting image features from each of the image segments of the array to generate numerical coefficients for each of the image segments of the array, wherein the image features include graphical parameters comprising at least one of a text field and graphical elements;
      a comparator for comparing the numerical coefficients of respective pairs of consecutive image segments of the array to generate a number of sub-codes; and
      a classification code generating unit for generating a classification code for the document images, wherein the classification code is a combination of the number of sub-codes; and
      a database for storing the classification code of the document image,
      wherein each of the image segment comprises an array of pixels in two-dimensional directions and the two-dimensional array of pixels can be transformed into a one-dimensional array of pixels in either vertical or horizontal direction.

10. The apparatus of claim 9, wherein the computing device sequentially processes a number of the document images received from the inputting device to generate and store a number of classification codes in the database.

11. The apparatus of claim 9, wherein the numerical coefficients of each of the image segments is calculated as one of a mean value, a standard deviation for at least one of vertical and horizontal directions, and a coordinate of center of mass of the one-dimensional array of pixels.

12. The apparatus of claim 9, wherein the image processor further uses graphical filters as gray-scale thresholds when extracting the image features of said each image segment of the array.

13. The apparatus of claim 9, further comprising
   a similarity rate generating unit for generating similarity rates between at least two document images, each of the document images has a classification code comprised of a combination of sub-codes, wherein each of the similarity rates is generated by subtracting sub-codes contained in the classification codes of the document images that are to be compared.

14. The apparatus of claim 13, further comprising:
   a categorizing unit for categorizing the document images based on the similarity rates and grouping the document images with higher similarity rates in one or more specific groups.

15. A method for calculating similarity rates between a number of document images using a computing device, comprising:
   for each of the document images,
      dividing the document image into an array of image segments;
      processing each of the image segments of the array to obtain a set of numerical coefficients, each of which corresponds to one of the image segments of the array, wherein each of the image segments of the array forms a portion of the document image and includes graphical parameters comprising at least one of a text field and graphical elements;
      comparing the numerical coefficients of respective pairs of consecutive image segments of the array to generate a series of sub-codes; and
      generating a classification code for the document image, wherein the classification code is a combination of the series of sub-codes; and generating similarity rates between the number of document images, each of the document images has a classification code comprised of a combination of sub-codes, wherein the similarity rates are generated by subtracting the sub-codes of the classification codes of the document images that are to be compared.

16. The method of claim 15, further comprising categorizing the document images based on the similarity rates, wherein the documents with high similarity rates are grouped in a specific category.

17. The method of claim 15, wherein each of the image segment comprises an array of pixels in two-dimensional directions, the two-dimensional array of pixels is transformed into a one-dimensional array of pixels in either vertical or horizontal direction, and the numerical coefficients of each of the image segments is calculated as one of a mean value, a standard deviation for at least one of vertical and horizontal directions, and a coordinate of center of mass of the one-dimensional array of pixels.

18. The method of claim 15, further comprising applying graphical filters as gray-scale thresholds when processing the image segments of the document images.

19. The method of claim 15, wherein the sub-codes are integer numbers that reflect graphical attributes of the image segments of the array or a ratio of attributes between the image segments of the array.

* * * * *